US008280733B2

(12) United States Patent
Yu et al.

(10) Patent No.: US 8,280,733 B2
(45) Date of Patent: *Oct. 2, 2012

(54) AUTOMATIC SPEECH RECOGNITION LEARNING USING CATEGORIZATION AND SELECTIVE INCORPORATION OF USER-INITIATED CORRECTIONS

(75) Inventors: Dong Yu, Kirkland, WA (US); Peter Mau, Bellevue, WA (US); Mei-Yuh Hwang, Sammamish, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 62 days.

This patent is subject to a terminal disclaimer.

(21) Appl. No.: 12/884,434

(22) Filed: Sep. 17, 2010

(65) Prior Publication Data
US 2011/0015927 A1    Jan. 20, 2011

Related U.S. Application Data

(63) Continuation of application No. 10/761,451, filed on Jan. 20, 2004, now Pat. No. 8,019,602.

(51) Int. Cl.
G10L 15/00 (2006.01)
G10L 15/06 (2006.01)
G10L 15/04 (2006.01)
G10L 15/14 (2006.01)
G10L 21/00 (2006.01)

(52) U.S. Cl. ........ 704/231; 704/235; 704/243; 704/251; 704/256; 704/270

(58) Field of Classification Search .................. 704/231, 704/235, 243, 251, 254, 256, 270
See application file for complete search history.

(56) References Cited

U.S. PATENT DOCUMENTS

| 5,029,406 A | 7/1991 | Hofman |
| 5,644,680 A | 7/1997 | Bielby et al. |
| 5,748,840 A | 5/1998 | La Rue |
| 5,852,801 A | 12/1998 | Hon et al. |
| 5,855,000 A | 12/1998 | Waibel et al. |
| 5,857,099 A | 1/1999 | Mitchell et al. |
| 5,864,805 A | 1/1999 | Chen et al. |

(Continued)

FOREIGN PATENT DOCUMENTS

EP       0 773 532       5/1997

(Continued)

OTHER PUBLICATIONS

Larson, K., and Mowatt, D. 2003. Speech Error Correction:The Story of the Alternatives List. International Journal ofSpeech Technology 6(2):183-194.*

(Continued)

Primary Examiner — Paras D Shah
(74) Attorney, Agent, or Firm — Westman, Champlin & Kelly, P.A.

(57) ABSTRACT

An automatic speech recognition system recognizes user changes to dictated text and infers whether such changes result from the user changing his/her mind, or whether such changes are a result of a recognition error. If a recognition error is detected, the system uses the type of user correction to modify itself to reduce the chance that such recognition error will occur again. Accordingly, the system and methods provide for significant speech recognition learning with little or no additional user interaction.

17 Claims, 4 Drawing Sheets

U.S. PATENT DOCUMENTS

| | | | |
|---|---|---|---|
| 5,884,258 A | | 3/1999 | Rozak et al. |
| 5,950,160 A | * | 9/1999 | Rozak .......................... 704/252 |
| 5,963,903 A | | 10/1999 | Hon et al. |
| 6,064,959 A | | 5/2000 | Young et al. |
| 6,092,044 A | * | 7/2000 | Baker et al. .................. 704/254 |
| 6,138,099 A | | 10/2000 | Lewis et al. |
| 6,195,635 B1 | | 2/2001 | Wright |
| 6,253,177 B1 | * | 6/2001 | Lewis et al. .................. 704/235 |
| 6,263,308 B1 | | 7/2001 | Heckerman et al. |
| 6,347,300 B1 | | 2/2002 | Minematsu |
| 6,377,921 B1 | | 4/2002 | Bahl et al. |
| 6,418,410 B1 | | 7/2002 | Nassiff et al. |
| 6,434,521 B1 | | 8/2002 | Barnard |
| 6,490,555 B1 | | 12/2002 | Yegnanarayanan et al. |
| 6,507,816 B2 | * | 1/2003 | Ortega ......................... 704/235 |
| 6,513,005 B1 | | 1/2003 | Qin et al. |
| 6,577,999 B1 | | 6/2003 | Lewis et al. |
| 6,675,142 B2 | * | 1/2004 | Ortega et al. ................. 704/235 |
| 6,879,956 B1 | | 4/2005 | Honda et al. |
| 6,912,498 B2 | | 6/2005 | Stevens et al. |
| 6,941,264 B2 | * | 9/2005 | Konopka et al. .............. 704/243 |
| 7,219,059 B2 | | 5/2007 | Gupta et al. |
| 7,266,795 B2 | | 9/2007 | Baumgartner et al. |
| 2002/0138265 A1 | * | 9/2002 | Stevens et al. ............... 704/251 |
| 2002/0165716 A1 | | 11/2002 | Mangu et al. |
| 2003/0139922 A1 | | 7/2003 | Hoffmann et al. |
| 2003/0187643 A1 | | 10/2003 | Van Thong et al. |
| 2004/0117180 A1 | | 6/2004 | Rajput et al. |
| 2004/0199385 A1 | | 10/2004 | Deligne et al. |

FOREIGN PATENT DOCUMENTS

| | | |
|---|---|---|
| EP | 0 867 858 | 9/1998 |
| WO | WO 01/04874 | 1/2001 |

OTHER PUBLICATIONS

Parent U.S. Appl. No. 10/761,451, filed Jan. 20, 2004.
European Search Report/Communication for EU Appln. No. 05 10 0140, Apr. 21, 2005.
Yu et al., Dong.; "Unsupervised Learning from Users' Error Correction in Speech Dictation," Speech Technology Group, Microsoft Research, Best Available Translation, 8th ICSLP, Oct. 4, 2004, Jeju Island, Korea.
Wu, Jun.; "Maximum Entropy Language Modeling with Non-Local Dependencies," Dissertation to Johns Hopkins University, Baltimore, Maryland, 2002. pp. 1-234.
Wester, M.; "Pronunciation Modeling for ASR—knowledge-based and data-derived methods," Dept. of Language and Speech, Computer Speech and Language, 2002, pp. 1-17. www.sciencedirect.com, 2002.
Moreno et al., P.; "A Boosting Approach for Confident Scoring," Compaq Cambridge Research Laboratory, Cambridge MA, pp. 1-4, 2001.
Kuhn & De Mori, R. & R.; "A Cache-Based Natural Language Model for Speech Recognition," IEEE Transactions on Pattern Analysis and Machine Intelligence, vol. 12, No. 6, Jun. 1990, pp. 1-17.
Beaufays et al., F.; "Learning Linguistically Valid Pronunciations From Acoustic Data," Eurospeech 2003, Geneva, pp. 2593-2596.
Yu et al., D.; "Improved Name Recognition With User Modeling," Eurospeech 2003, Geneva, pp. 1229-1232.
Lamel & Adda, L. & G.; "On Designing Pronunciation Lexicons for Large Vocabulary, Continuous Speech Recognition," Fourth Int'l Conference on Spoken Language Processing, Oct. 3-6, 1996.
Deng & Huang, L. & X.; "Challenges in Adopting Speech Recognition," Communications of the ACM, Jan. 2004, V. 47, No. 1, pp. 69-75.
Non-final Office Action dated Jun. 20, 2007, for related U.S. Appl. No. 10/761,451, filed Jan. 20, 2004.
Final Office Action dated Nov. 7, 2007, for related U.S. Appl. No. 10/761,451, filed Jan. 20, 2004.
Non-Final Office Action dated Jun. 27, 2008, for related U.S. Appl. No. 10/761,451, filed Jan. 20, 2004.
Final Office Action dated Dec. 5, 2008, for related U.S. Appl. No. 10/761,451, filed Jan. 20, 2004.
First Chinese Official Action dated Feb. 20, 2009 for Serial No. 200510005937.9, filed Jan. 20, 2005, entitled Automatic Speech Recognition Learning Using User Corrections, pp. 1-13.
Office Action dated Jun. 8, 2009, for related U.S. Appl. No. 10/761,451, filed Jan. 20, 2004.
Fosler et al., E.; "Automatic Learning of Word Pronunciation From Data," JHU/CLSP Workshop, Oct. 1996.
Third Chinese Official Action dated Aug. 28, 2009, for Serial No. 200510005937.9, filed Jan. 20, 2005, 1-7 pgs—with Best Available Translation.
Fourth Chinese Official Action dated Nov. 20, 2009, for Serial No. 200510005937.9, filed Jan. 20, 2005, 1-8 pgs—with Best Available Translation.
Final Office Action dated Dec. 21, 2009, for Serial No. 200510005937.9, filed Jan. 20, 2005.
Second Chinese Official Action dated Jun. 26, 2009, for Serial No. 200510005937.9, filed Jan. 20, 2005,—with Best Available Translation.
European Office Action for Serial No. 05100140.2, Filed Jan. 12, 2005.
Office Action dated Apr. 30, 2010, for U.S. Appl. No. 10/761,451, filed Jan. 20, 2004. pp. 1-9.
European Office Action dated Aug. 27, 2010, for EP Serial No. 05 100 140.2, Filed Jan. 12, 2005.

* cited by examiner

AUTOMATIC SPEECH RECOGNITION LEARNING USING CATEGORIZATION AND SELECTIVE INCORPORATION OF USER-INITIATED CORRECTIONS

CROSS-REFERENCE TO RELATED APPLICATION

The present application is a continuation of and claims priority of U.S. patent application Ser. No. 10/761,451, filed Jan. 20, 2004, the content of which is hereby incorporated by reference in its entirety.

FIELD OF THE INVENTION

The present invention relates to computer speech recognition, and more particularly, to training a computer speech recognition system.

BACKGROUND OF THE INVENTION

The rapid and accurate recognition of human speech by a computer system has been a long-sought goal by developers of computer systems. The benefits that would result from such a computer speech recognition (CSR) system are substantial. For example, rather than typing a document into a computer system, a person could simply speak the words of the document, and the CSR system would recognize the words and store the letters of each word as if the words had been typed. Since people generally can speak faster than type, efficiency would be improved. Also, people would no longer need to learn how to type. Computers could also be used in many applications where their use is currently impracticable because a person's hands are occupied with tasks other than typing.

Typical CSR systems recognize words by comparing a spoken utterance to a model of each word in a vocabulary. The word whose model best matches the utterance is recognized as the spoken word. A CSR system may model each word as a sequence of phonemes that compose the word. To recognize an utterance, the CSR system identifies a word sequence, the phonemes of which best match the utterance. These phonemes may, however, not exactly correspond to the phonemes that compose a word. Thus, CSR systems typically use a probability analysis to determine which word most closely corresponds to the identified phonemes.

When recognizing an utterance, a CSR system converts the analog signal representing the utterance to a more useable form for further processing. The CSR system first converts the analog signal into a digital form. The CSR system then applies a signal processing technique, such as fast fourier transforms (FFT), linear predictive coding (LPC), or filter banks, to the digital form to extract an appropriate parametric representation of the utterance. A commonly used representation is a "feature vector" with FFT or LPC coefficients that represent the frequency and/or energy bands of the utterance at various intervals (referred to as "frames"). The intervals can be short or long based on the computational capacity of the computer system and the desired accuracy of the recognition process. Typical intervals may be in the range of 10 milliseconds. That is, the CSR system would generate a feature vector for every 10 milliseconds of the utterance. Each frame is typically 25 ms long. Therefore, a 25 ms long frame is generated every 10 ms. There is an overlap between successive frames.

To facilitate the processing of the feature vectors, each feature vector is quantized into one of a limited number (e.g., 256) of "quantization vectors." That is, the CSR system defines a number of quantization vectors that are selected to represent typical or average ranges of feature vectors. The CSR system then compares each feature vector to each of the quantization vectors and selects the quantization vector that most closely resembles the feature vector to represent the feature vector. Each quantization vector is uniquely identified by a number (e.g., between 1 and 256), which is referred to as a "codeword." When a feature vector is represented as a quantization vector, there is a loss of information because many different feature vectors map to the same quantization vector. To ensure that this information loss will not seriously impact recognition, CSR systems may define thousands or millions of quantization vectors. The amount of storage needed to store the definition of such a large number of quantization vectors can be considerable. Thus, to reduce the amount of storage needed, CSR systems segment feature vectors and quantize each segment into one of a small number (e.g., 256) quantization vectors. Thus, each feature vector is represented by a quantization vector (identified by a codeword) for each segment. For simplicity of explanation, a CSR system that does not segment a feature vector and thus has only one codeword per feature vector (or frame) is described.

As discussed above, a spoken utterance often does not exactly correspond to a model of a word. The difficulty in finding an exact correspondence is due to the great variation in speech that is not completely and accurately captured by the word models. These variations result from, for example, the accent of the speaker, the speed and pitch at which a person speaks, the current health (e.g., with a cold) of the speaker, the age and sex of the speaker, etc. CSR systems that use probabilistic techniques have been more successful in accurately recognizing speech than techniques that seek an exact correspondence.

One such probabilistic technique that is commonly used for speech recognition is hidden Markov modeling. A CSR system may use a hidden Markov model ("HMM") for each word in the vocabulary. The HMM for a word includes probabilistic information from which can be derived the probability that any sequence of codewords corresponds to that word. Thus, to recognize an utterance, a CSR system converts the utterance to a sequence of codewords and then uses the HMM for each word to determine the probability that the word corresponds to the utterance. The CSR system recognizes the utterance as the word with the highest probability.

An HMM is represented by a state diagram. State diagrams are traditionally used to determine a state that a system will be in after receiving a sequence of inputs. A state diagram comprises states and transitions between source and destination states. Each transition has associated with it an input which indicates that when the system receives that input and it is in the source state, the system will transition to the destination state. Such a state diagram could, for example, be used by a system that recognizes each sequence of codewords that compose the words in a vocabulary. As the system processes each codeword, the system determines the next state based on the current state and the codeword being processed. In this example, the state diagram would have a certain final state that corresponds to each word. However, if multiple pronunciations of a word are represented, then each word may have multiple final states. If after processing the codewords, the system is in a final state that corresponds to a word, then that sequence of codewords would be recognized as the word of the final state.

An HMM, however, has a probability associated with each transition from one state to another for each codeword. For example, if an HMM is in state 2, then the probability may be 0.1 that a certain codeword would cause a transition from the current state to a next state, and the probability may be 0.2 that the same codeword would cause a transition from the current state to a different next state. Similarly, the probability may be 0.01 that a different codeword would cause a transition from the current state to a next state. Since an HMM has probabilities associated with its state diagram, the determination of the final state for a given sequence of codewords can only be expressed in terms of probabilities. Thus, to determine the probability of each possible final state for a sequence of codewords, each possible sequence of states for the state diagram of the HMM needs to be identified and the associated probabilities need to be calculated. Each such sequence of states is referred to as a state path.

To determine the probability that a sequence of codewords represents a phoneme, the CSR system may generate a probability lattice. The probability lattice for the HMM of a phoneme represents a calculation of the probabilities for each possible state path for the sequence of codewords. The probability lattice contains a node for each possible state that the HMM can be in for each codeword in the sequence. Each node contains the accumulated probability that the codewords processed so far will result in the HMM being in the state associated with that node. The sum of the probabilities in the nodes for a particular codeword indicates the likelihood that the codewords processed so far represent a prefix portion of the phoneme.

The accuracy of a CSR system depends, in part, on the accuracy of the output and transition probabilities of the HMM for each phoneme. Typical CSR systems "train" the CSR system so that the output and transition probabilities accurately reflect speech of the average speaker. During training, the CSR system gathers codeword sequences from various speakers for a large variety of words. The words are selected so that each phoneme is spoken a large number of times. From these codeword sequences, the CSR system calculates output and transition probabilities for each HMM. Various iterative approaches for calculating these probabilities are well-known.

A problem with such training techniques, however, is that such average HMMs may not accurately model the speech of people whose speech pattern is different than the average. In general, every person will have certain speech patterns that differ from the average. Consequently, CSR systems allow a speaker to train the HMMs to adapt to the speaker's speech patterns. In such training, CSR systems refine the HMM parameters, such as the output and transition probabilities and the quantization vectors represented by the codewords, by using training utterances spoken by the actual user of the system. The adapted parameters are derived by using both the user-supplied data as well as the information and parameters generated from the large amount of speaker-independent data. Thus, the probabilities reflect speaker-dependent characteristics.

A CSR system is typically trained by presenting a large variety of pre-selected words to a speaker. These words are selected to ensure that a representative sample of speech corresponding to each phoneme can be collected. With this representative sample, the CSR system can ensure that any HMM that does not accurately reflect the speaker's pronunciation of that phoneme can be adequately adapted. Since the CSR system functions in terms of probabilities, the more training that is provided, the more accurate subsequent speech recognition will be. However, as more and more training is done, the degree to which recognition accuracy will increase for a given amount of additional training begins to decline. Further, requiring user's to provide substantial investments in training time may diminish the user's experience.

Accordingly, there is a balance between the degree to which the user is called upon to train the system, and the degree to which the user can effectively use the system. Given the complexities of human language, it is very conceivable that even after extensive training, the system will occasionally generate errors. Another reason that causes a spoken utterance to not be matched with a corresponding model of a word, is when the word is new. A possible solution includes increasing the vocabulary size, which may lower recognition accuracy. Another solution is through user training in which the user adds new words. Current systems allow user's to manually add new words with his or her pronunciation to a suitable lexicon, whether it be a system lexicon, a vendor or application lexicon, or a user-specific lexicon by using a user interface that allows a user to add or delete a word like an ADD/DELETE Words Dialog box. However, this can become troublesome in cases where users may need to add a significant number of words. It is also known to adapt the language model (LM) using documents and e-mails authored by the user. This approach is limited in that pronunciations are not added into the lexicon and the quality of the language model adaptation depends largely on the filtering of the source documents.

Thus, a need exists for a system that can easily learn new words and pronunciations thereof from users without requiring significant user intervention. Achieving this object would allow enhanced automatic speech recognition system learning without diminishing the user experience by requiring undue training effort.

SUMMARY OF THE INVENTION

An automatic speech recognition system recognizes user changes to dictated text and infers whether such changes result from the user changing his/her mind, or whether such changes are a result of correcting a recognition error. If a correction from a recognition error is detected, the system uses the type of user correction to modify itself to reduce the chance that such recognition error will occur again. Accordingly, the system and methods provide for significant speech recognition learning with little or no additional user interaction.

DETAILED DESCRIPTION OF ILLUSTRATIVE EMBODIMENTS

Figure 1:
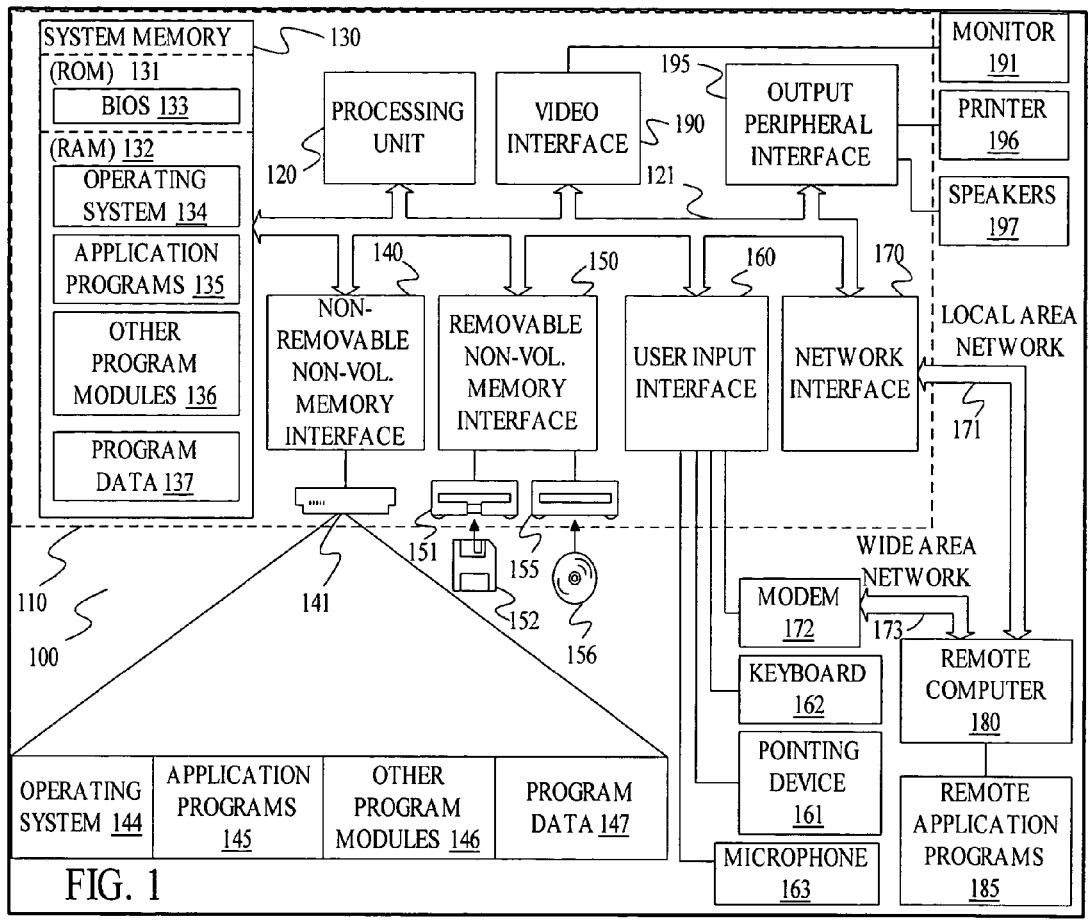
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

Drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
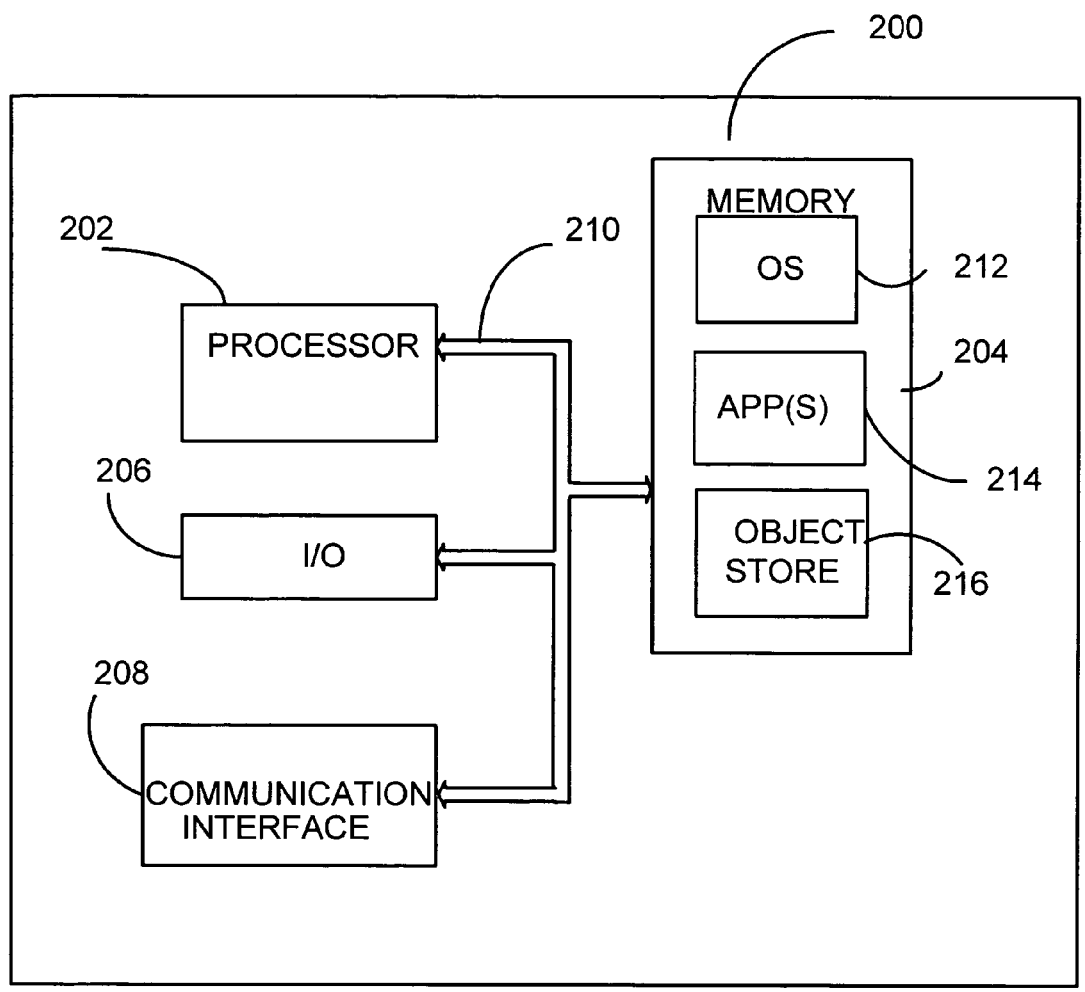
FIG. 2 is a block diagram of an alternative computing environment in which the present invention may be practiced.

FIG. 2 is a block diagram of a mobile device 200, which is an exemplary computing environment. Mobile device 200 includes a microprocessor 202, including cache memory 203, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Aspects of the present invention generally leverage natural user interaction to automatically learn new words, pronunciations and word pairs. Generally this is accomplished by inferring whether the user is modifying text because he or she has changed his or her mind, or whether the user is making a correction due to an inability of the system to recognize the user's speech.

Figure 3:
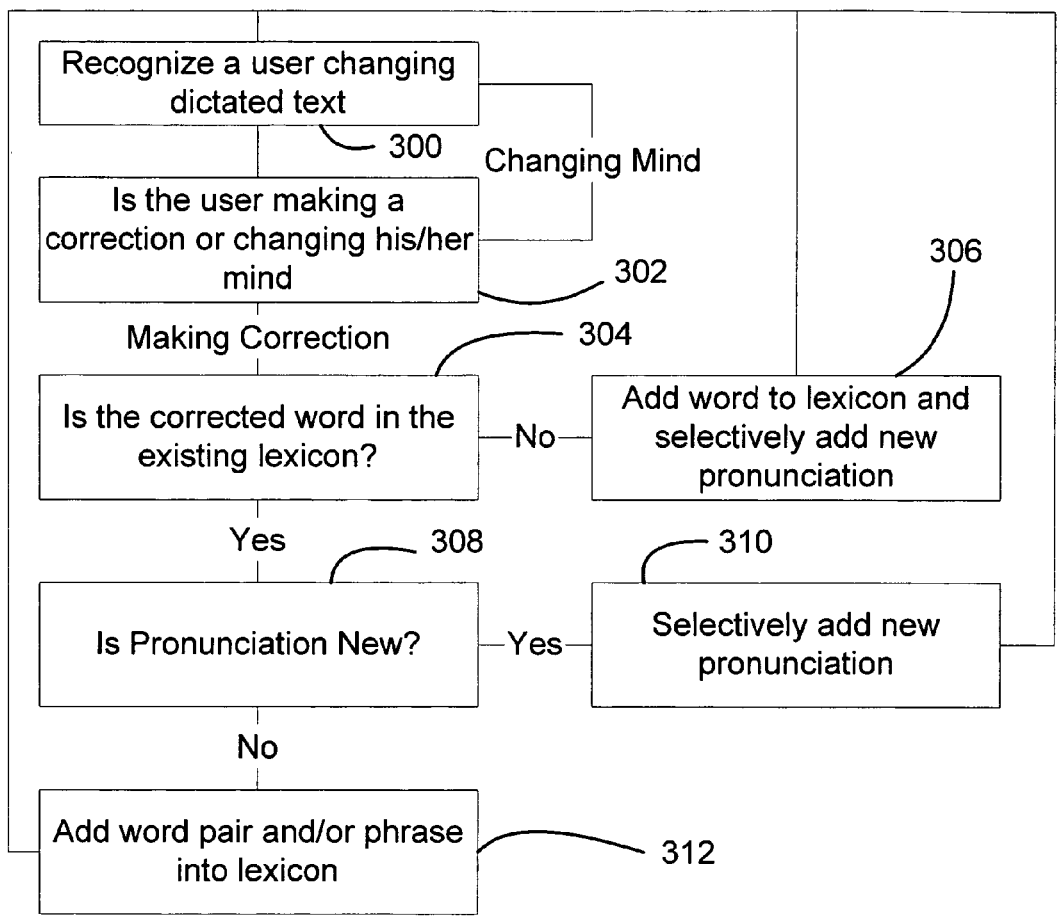
FIG. 3 is a block diagram of a method of learning with a speech recognition system in accordance with an embodiment of the present invention.

FIG. 3 is a flow diagram of a method of automatically learning from user interactions with the system, in accordance with an embodiment of the present invention. The method begins at block 300 when a user's change of dictated text is recognized by the system. This change will generally be in the form of the user selecting a new word from the alternate list; the user re-dictating a word or phrase; the user deleting some words; the user is modifying existing words, or the user typing some new words. Once a change is recognized, control passes to block 302 where the system infers whether the user is making an actual correction, or is simply changing his or her mind. A number of hints or indications can be used to inform the inference. For example, when the user is selecting from the alternate list, the user is making a correction. Another example is when the acoustic characteristics between the original dictation and the corrected words are similar, the user is making a correction. On the other hand, if the user makes a change after a relatively long time since the text was dictated, the user is probably editing based on a change of mind. Additionally, if the user changes a significant number of words in the dictated sentences, the user probably editing based upon a change of mind. Optionally, the system may simply ask the user for confirmation regarding the user's intent.

In order to identify the segment(s) where the correction occurs, Dynamic Time Warping (DTW) is illustratively used. Then, the speech recognition engine score of the dictated text and the corrected text can be compared. This allows the system to determine if the user is correcting to a similar-sounding word, or perhaps editing to a new word based upon a change of mind. Additional confidence scores or metrics can be used to improve the inference between corrections vs. editing as desired. If the result is that the system determines that the user is simply changing his or her mind, control returns to block 300 via line 303.

At block 304, the system consults the lexicon to determine if the corrected word is in the lexicon. If the corrected word is not in the user lexicon, control passes to block 306, where the word is added to the lexicon and selectively add the new pronunciation and the language model is adapted accordingly. The process of determining whether to add a new pronunciation is also described in greater detail with respect to FIG. 4. After block 306, control returns to block 300.

If, however, the corrected word is in the user lexicon, control passes to block 308 where the system determines if the pronunciation is new. A new pronunciation can be caused by the pronunciation of a new word, or a user-specific pronunciation of existing words. The process of determining if the pronunciation is new will be described in greater detail with respect to FIG. 4. If the pronunciation is a new pronunciation, control passes to block 310 where the new pronunciation may be selectively learned. After block 310, control returns to block 300.

If the pronunciation is not new, control passes from block 308 to block 312. This is a situation in which the corrected word is in the user lexicon, and the pronunciation of the corrected word is also known. In this case, the word pair and/or phrase is added into the lexicon or the language model score associated with the corrected text is updated to boost the chance that the words are connected. In most cases, this is a temporary change, lasting, for example, one to two days. Thus, if "wave two" is misrecognized as "wave too" and gets corrected by the user, the system automatically adds "wave two" into the user lexicon temporarily. "Temporarily" is somewhat dynamic based on the most recent time the word pair is observed, and the relative frequency that the pair has been observed in the past. Besides adding word pairs and/or phrases, the probability of the newly observed known pronunciation might also be increased if the system supports it. Although all of the steps illustrated in FIG. 3 can be implemented in a single system for best results, embodiments of the present invention can be practiced without such steps necessarily coexisting in a single system. After block 312, control returns to block 300.

Figure 4:
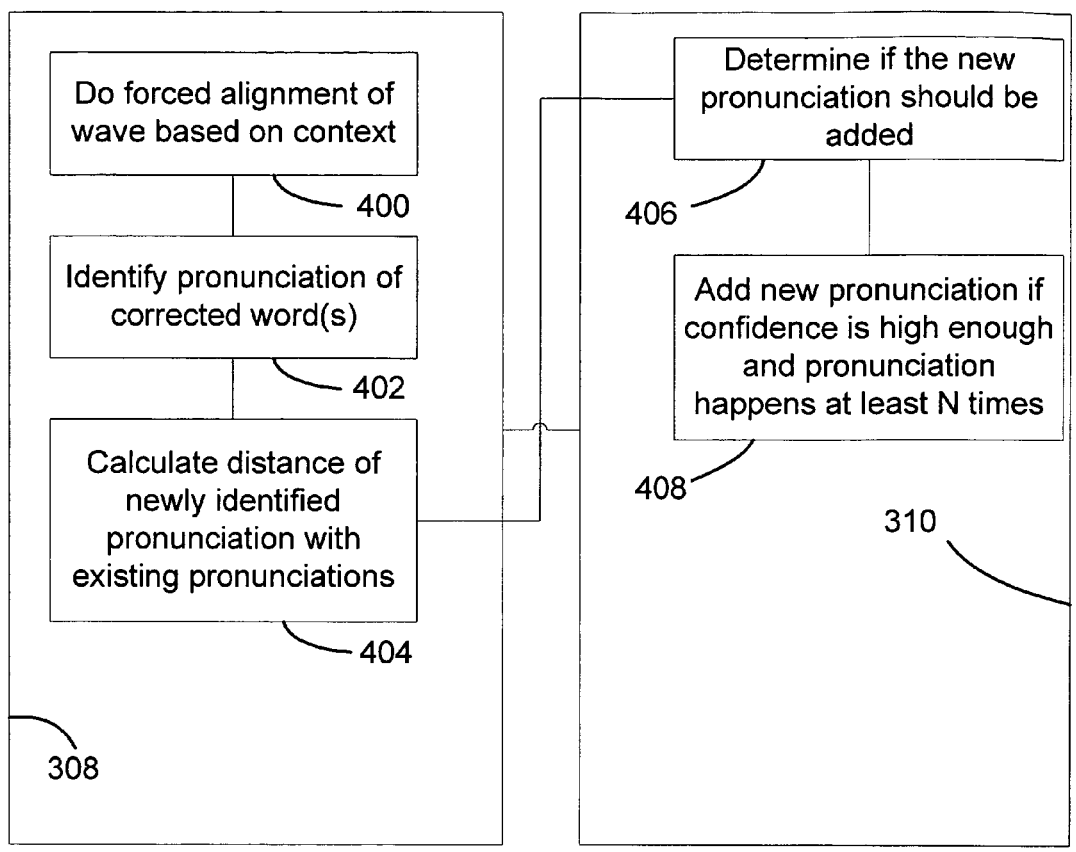
FIG. 4 is a block diagram of a portion of a method of learning with a speech recognition system in accordance with an embodiment of the present invention.

FIG. 4 is a diagrammatic view of a portion of the method described with respect to FIG. 3. FIG. 4 illustrates blocks 308 and 310 in greater detail. Within block 308, block 400 operates first to force the alignment of the wave (digitized sound) based on the context words. Context words are generally the single words both before and after the corrected word. For example, if the dictated sentence is "This is a text .\period" and the user changed "text" to be "test", the phrase "a test .\period" and the corresponding wave is used to do the alignment to determine the correct boundaries for each word. Once the forced alignment is complete and the boundaries are determined, control passes to block 402 where the pronunciation of the corrected words are identified preferably using a lattice. The lattice is built upon the possible pronunciations generated by a Letter to Speech (LTS) component. This can be any suitable component that can generate a sequence of phonemes based upon a textual input. The lattice is also constructed using the phoneme sequences in the recognition result or from a basic phoneme recognizer. The phoneme lattice that is so constructed allows the system to choose the best phoneme path in the lattice as the correct pronunciation. Once the best phoneme is chosen, control passes to block 404, where the distance between the newly identified pronunciation and existing pronunciations is calculated.

At block 404, the phone confusion matrix and Dynamic Time Warping are used to calculate the distance between the newly identified pronunciation and existing pronunciations. Alternative distance calculation methods may also be used. For example, the distance can be calculated based on the acoustic model score on the new pronunciation and the existing pronunciations. The distance is preferably compared to a pre-selected or dynamic threshold to determine whether the pronunciation should be learned. Thus, only pronunciations where the distance exceeds some threshold will be learned.

At block 406, the system determines whether the new pronunciation should be added. This decision is preferably based upon the calculated distance from block 404, the closest existing pronunciation, the Acoustic Model (AM) confidence, and the frequency with which the new pronunciation has appeared in the user's dictation. Deciding whether to add the pronunciation selectively based upon these factors will help ensure that errors from misalignment, and/or incorrect inferences of whether the user is doing a correction will not cause learning that decreases system effectiveness. Examples of pronunciation confidence calculations include the following:

$$C(\text{pron})=1-(1-p(d,AM))^f; \text{ and}$$

$$C(\text{pron})=1/[d/f\log(\text{len1}+\text{len2})]$$

where d is the distance between the recognized pronunciation and the best match in the lexicon, f is the frequency that the same recognized pronunciation is pronounced, and p(d,AM) is the probability that a pronunciation with such a distance d and AM score is the correct pronunciation. Len1 and len2 are the lengths of the phonemes in the new pronunciation and the closest pronunciation, respectively. P(d,AM) is learned with training.

At block 408, the system selectively adds the new pronunciation. Preferably, the pronunciation is added if the confidence score calculated in block 406 is high enough, and the new pronunciation has occurred a selected number (N) times in the user's dictation.

By applying a threshold to the calculated confidence score, the system in accordance with embodiments of the present invention will only learn the minimum amount in order to ensure that the system is not unduly affected by learning from user editing resulting from the user simply changing his or her mind.

Although the present invention has been described with reference to preferred embodiments, workers skilled in the art will recognize that changes may be made in form and detail without departing from the spirit and scope of the invention.

What is claimed is:

1. A computer-implemented speech recognition system, comprising:
   a microphone that receives user speech;
   a speech recognition engine coupled to the microphone, the speech recognition engine recognizing the user speech and providing a corresponding textual output on a user interface;
   a change recognition component that automatically assigns a categorization to a user-initiated change to the corresponding textual output, the categorization being automatically assigned based at least in part upon a measurement of time indicative of how long it took the user to initiate the change, upon whether or not the user utilized an alternate list to generate the user initiated change, upon an acoustic similarity between the original textual output and the change to the textual output, and upon a number of words that is changed between the original textual output and the change to the textual output; and
   wherein automatically assigning the categorization comprises automatically identifying the user-initiated change as being either a correction or an edit operation, wherein the user-initiated change is identified as the correction upon the measurement of time indicating that there was a relatively short amount of time between providing the original textual output and the user initiating the change, wherein the user-initiated change is identified as the correction upon the user utilizing the alternate list, wherein the user-initiated change is identified as the correction upon the original textual output and the change to the textual output being acoustically similar, and wherein the user-initiated change is identified as the correction upon the number of words that is changed between the original textual output and the change to the textual output is determined to be insignificant, and wherein otherwise the categorization is determined to be the edit operation; and an adaptation component that selectively adapts the speech recognition engine depending upon the categorization.

2. The system of claim 1, wherein selectively adapting comprises adapting or not adapting depending upon the categorization.

3. The system of claim 1, wherein selectively adapting comprises adapting or not adapting depending upon whether the categorization is indicates that the user-initiated change is a correction or an edit operation.

4. The system of claim 1, wherein selectively adapting comprises not adapting if the categorization indicates that the user-initiated correction is not due to a recognition error made by the speech recognition engine.

5. The system of claim 1, wherein selectively adapting comprises adapting only if the categorization indicates that the user-initiated correction is due to a recognition error made by the speech recognition engine, and wherein adapting comprises adapting so as to make it less likely that the speech recognition engine will subsequently repeat the recognition error during a subsequent recognition operation.

6. The system of claim 1, wherein automatically assigning the categorization further comprises automatically assigning based at least in part on information received in response to prompting the user for a confirmation.

7. A computer-implemented method for adapting a speech recognition system, comprising:

detecting a user-initiated change to dictated text;

automatically assigning a categorization to the user-initiated change to the dictated text, the categorization being automatically assigned based at least in part upon a measurement of time indicative of how long it took the user to initiate the change, wherein automatically assigning the categorization comprises automatically identifying, based at least in part upon the measurement of time, the user-initiated change as being either a correction or an edit operation;

calculating a distance between a pronunciation of the dictated text and a pronunciation of the change to the dictated text;

comparing the calculated distance to a threshold value; and selectively adapting the speech recognition engine depending upon the categorization and the calculated distance, and wherein selectively adapting further comprises determining a number of times that the pronunciation of the change to the dictated text has occurred and then selectively adapting the speech recognition engine when the number of times exceeds a selected number of times.

8. The method of claim 7, wherein selectively adapting comprises adapting or not adapting depending upon the categorization.

9. The method of claim 7, wherein selectively adapting comprises adapting or not adapting depending upon whether the categorization indicates that the user-initiated change is a correction or an edit operation.

10. The method of claim 7, wherein selectively adapting comprises not adapting if the categorization indicates that the user-initiated correction is not due to a recognition error made by the speech recognition engine.

11. The method of claim 7, wherein selectively adapting comprises adapting only if the categorization indicates that the user-initiated correction is due to a recognition error made by the speech recognition engine, and wherein adapting comprises adapting so as to make it less likely that the speech recognition engine will subsequently repeat the recognition error during a subsequent recognition operation.

12. A computer-implemented method for adapting a speech recognition system, comprising:

detecting a user-initiated change to dictated text;

automatically assigning a categorization to the user-initiated change to the dictated text, the categorization being automatically assigned based at least in part upon a measurement of a number of words changed as a result of the user-initiated change, wherein automatically assigning the categorization comprises automatically identifying, based at least in part upon the measurement of the number of words, the user-initiated change as being either a correction or an edit operation;

determining a number of times and a most recent time that the user-initiated change has occurred; and selectively adapting the speech recognition engine by temporarily adding a word pair associated with the user-initiated change to a lexicon of the speech recognition engine based at least in part upon the categorization, the number of times the user-initiated change has occurred, and the most recent time that the user-initiated change has occurred, and wherein selectively adapting the speech recognition engine further comprises increasing a probability of a pronunciation associated with the word pair.

13. The method of claim 12, wherein selectively adapting comprises adapting or not adapting depending upon the categorization.

14. The method of claim 12, wherein selectively adapting comprises adapting or not adapting depending upon whether the categorization is indicates that the user-initiated change is a correction or an edit operation.

15. The method of claim 12, wherein selectively adapting comprises not adapting if the categorization indicates that the user-initiated correction is not due to a recognition error made by the speech recognition engine.

16. The method of claim 12, wherein selectively adapting comprises adapting only if the categorization indicates that the user-initiated correction is due to a recognition error made by the speech recognition engine, and wherein adapting comprises adapting so as to make it less likely that the speech recognition engine will subsequently repeat the recognition error during a subsequent recognition operation.

17. The method of claim 12, wherein automatically assigning comprises automatically assigning based at least in part on a comparison of a speech recognition score of the dictated text to a speech recognition score of the dictated text after application of the user-initiated change.

* * * * *